(12) United States Patent
Nagata

(10) Patent No.: US 8,793,979 B2
(45) Date of Patent: Aug. 5, 2014

(54) CONTROL DEVICE AND CONTROL METHOD FOR REDUCTION AGENT INJECTION VALVE

(75) Inventor: Masayasu Nagata, Saitama (JP)

(73) Assignee: Bosch Corporation, Tokyo (JP)

( * ) Notice: Subject to any disclaimer, the term of this patent is extended or adjusted under 35 U.S.C. 154(b) by 152 days.

(21) Appl. No.: 13/514,015

(22) PCT Filed: Oct. 6, 2010

(86) PCT No.: PCT/JP2010/067517
§ 371 (c)(1),
(2), (4) Date: Jun. 19, 2012

(87) PCT Pub. No.: WO2011/074311
PCT Pub. Date: Jun. 23, 2011

(65) Prior Publication Data
US 2012/0255282 A1 Oct. 11, 2012

(30) Foreign Application Priority Data

Dec. 15, 2009 (JP) ................................. 2009-283873

(51) Int. Cl.
*F01N 3/00* (2006.01)
*F01N 3/20* (2006.01)
(52) U.S. Cl.
CPC ............... *F01N 3/208* (2013.01); *Y02T 10/24* (2013.01); *F01N 2900/0601* (2013.01); *F01N 2610/02* (2013.01); *F01N 2900/1811* (2013.01); *F01N 2900/0412* (2013.01); *F01N 2900/1821* (2013.01); *F01N 2900/0416* (2013.01); *F01N 2610/1453* (2013.01)
USPC .................................. 60/286; 60/295; 60/274
(58) Field of Classification Search
CPC ......... F01N 3/20; F01N 9/00; F01N 2560/06; F01N 2610/03; F16K 31/06; F02D 41/20; F02D 2041/1433; F02D 2041/1437
USPC ........... 60/286, 274, 287, 295; 137/1, 565.16; 251/129.15; 239/135
See application file for complete search history.

(56) References Cited

U.S. PATENT DOCUMENTS 7,895,829 B2 * 3/2011 Suzuki et al. .................. 60/286
2004/0047783 A1 3/2004 Huber et al.
(Continued)

FOREIGN PATENT DOCUMENTS

DE 102007044808 4/2009
JP H1138711 2/1999
(Continued)

OTHER PUBLICATIONS
PCT/JP2010/067517 International Search Report, Dec. 28, 2010.

*Primary Examiner* — Thomas Denion
*Assistant Examiner* — Kelsey Stanek
(74) *Attorney, Agent, or Firm* — Michael Best & Friedrich LLP

(57) ABSTRACT

A controller and method of a reducing agent injector capable of accurately providing a required amount of ammonia to a reduction catalyst.

A controller for controlling energization of an electromagnetic solenoid, including: a target injection amount calculator for calculating a target injection amount of the reducing agent; a first current output signal calculator for calculating the duration of providing a first current output signal to be provided to the electromagnetic solenoid at the start of injection and calculating the DUTY ratio of the first current output signal; a second current output signal calculator for calculating the DUTY ratio of providing a second current output signal after the first current is provided; a temperature calculator for estimating a temperature within the reducing agent injector; and an output signal corrector for correcting at least one of the first current output signal and the second current output signal based on the temperature estimated.

6 Claims, 7 Drawing Sheets

(56) References Cited

U.S. PATENT DOCUMENTS

2009/0199538 A1* 8/2009 Boe et al. .................. 60/274
2009/0199540 A1* 8/2009 Kleinknecht ............... 60/274

FOREIGN PATENT DOCUMENTS

| | | |
|---|---|---|
| JP | 2000-58320 | 2/2000 |
| JP | 2001-20724 | 1/2001 |
| JP | 2002-242780 | 8/2002 |
| JP | 2002-339787 | 11/2002 |
| JP | 2004511715 | 4/2004 |
| JP | 2007056818 | 3/2007 |
| JP | 2007324262 | 12/2007 |
| JP | 2007332852 | 12/2007 |
| JP | 2008-180101 | 8/2008 |
| JP | 2008-190345 | 8/2008 |
| JP | 2009-520581 | 5/2009 |
| JP | 2009103072 | 5/2009 |
| JP | 2009-270567 | 11/2009 |
| JP | 2009270567 A * | 11/2009 |
| WO | 2008034747 | 3/2008 |

* cited by examiner

Fig.6

| | EFFECT | WHEN TEMPERATURE INCREASE (WHEN TEMPERATURE DECREASE) | INJECTION AMOUNT | TO BE CORRECTED |
|---|---|---|---|---|
| TEMPERATURE OF REDUCING AGENT $T_{urea}$ | VISCOSITY | SHARPLY DECREASE (SHARPLY INCREASE) | SHARPLY INCREASE (SHARPLY DECREASE) | PERIOD OF PROVIDING SECOND CURRENT OUTPUT SIGNAL OF UPSTREAM-SIDE PWM SIGNAL AND DUTY RATIO OF DOWNSTREAM-SIDE PWM SIGNAL |
| | CONCENTRATION | SLIGHTLY DECREASE (SLIGHTLY INCREASE) | SLIGHTLY DECREASE (SLIGHTLY INCREASE) | |
| TEMPERATURE OF SLIDING PART OF VALVE NEEDLE $T_{vlv}$ | SLIDING FRICTION OF VALVE NEEDLE | DECREASE (INCREASE) | INCREASE (DECREASE) | |
| TEMPERATURE OF ELECTROMAGNETIC SOLENOID $T_{sr}$ | SOLENOID ELECTRIC RESISTANCE | INCREASE (DECREASE) | DECREASE (INCREASE) | DUTY RATIO OF FIRST AND SECOND CURRENT OUTPUT SIGNALS OF UPSTREAM-SIDE PWM SIGNAL | ical driven reducing agent injector is known in which a controller controls movement of a valve needle by controlling energization of an electromagnetic solenoid to control opening and closing of an injection hole. This reducing agent injector is subject to the energization control based on a target injection duration determined depending on a target injection amount of reducing agent determined by calculation. Specifically, injection start time and injection duration are controlled by controlling the ON-OFF DUTY ratio (ratio of ON-duration to one cycle of pulse wave of PWM signal) of a switching device provided in a circuit for controlling the reducing agent injector (see Patent Document 1).

US 8,793,979 B2

1
CONTROL DEVICE AND CONTROL METHOD FOR REDUCTION AGENT INJECTION VALVE

BACKGROUND OF THE INVENTION

The present invention relates to a controller and control method of a reducing agent injector used for an exhaust gas purification apparatus. Particularly, the present invention relates to a controller and control method of a reducing agent injector for injecting reducing agent into an exhaust gas passageway of an internal combustion engine in order to reduce nitrogen oxide contained in exhaust gas.

Conventionally, exhaust gas exhausted from an internal combustion engine, such as a diesel engine, contains nitrogen oxide (NOX) that may cause environmental pollution. As an exhaust gas purification apparatus used for reducing and purifying this NOX, a selective catalytic reduction (SCR) system that uses urea solution as a reducing agent is known. The SCR system injects aqueous solution of urea into an exhaust gas passageway on the upstream side from reduction catalyst to cause ammonia produced from the aqueous solution of urea to act with NOX contained in exhaust gas in the reduction catalyst, decomposing NOX into nitrogen, water, carbon dioxide and the like to be released into atmosphere.

In such an SCR system, when the amount of the reducing agent to be injected into an exhaust pipe is excess or deficient with respect to the amount of NOX, some NOX remaining unreduced may be released into atmosphere or produced ammonia may slip into the downstream side from the reduction catalyst. In order to avoid such reduction in purification efficiency of NOX and ammonia slip, the SCR system is required to inject into the exhaust pipe just the right amount of reducing agent predetermined according to the amount of NOX.

As a device for feeding reducing agent in the SCR system, for example, an electromagnetic driven reducing agent injector is known in which a controller controls movement of a valve needle by controlling energization of an electromagnetic solenoid to control opening and closing of an injection hole. This reducing agent injector is subject to the energization control based on a target injection duration determined depending on a target injection amount of reducing agent determined by calculation. Specifically, injection start time and injection duration are controlled by controlling the ON-OFF DUTY ratio (ratio of ON-duration to one cycle of pulse wave of PWM signal) of a switching device provided in a circuit for controlling the reducing agent injector (see Patent Document 1).

In such an electromagnetic driven injector, while holding the valve needle open requires energization with only a relatively small amount of current, quickly moving the valve needle from the closed state to open the injection hole requires a relatively large amount of current.

Controlling opening and closing of an injector by PWM controlling a switching device is applied to a fuel injector for injecting fuel into a cylinder of an internal combustion engine as well as a reducing agent injector. Among those applications, methods for controlling a fuel injector provided to a diesel engine includes a control method for moving a valve needle quickly to ensure good controllability of a fuel injector by causing a first current to flow that is relatively large in the beginning of an injection period and then causing a second current to flow that is relatively small but enough to hold the valve open (see JP-A-2008-180101 (paragraph [0022]) and JP-A-2008-190345 (entire text and drawings)).

SUMMARY OF THE INVENTION

The above-described operation of the electromagnetic control injector is subject to influence from electric resistance of an electromagnetic solenoid, sliding friction of a valve needle and the like, which may cause an error between a target injection amount and an actual injection amount. In addition, for a reducing agent injector for injecting aqueous solution of urea, the amount of ammonia produced from the injected aqueous solution of urea is subject to influence from the viscosity, concentration and the like of the aqueous solution of urea, which may cause an error between a target injection amount and an actual injection amount or may cause the amount of produced ammonia to vary even when the target injection amount is the same as the actual injection amount.

Specifically, in an electromagnetic control reducing agent injector, an electromagnetic force caused by an electromagnetic solenoid for lifting a valve needle is defined by the product of the current flowing into the electromagnetic solenoid and the number of turns of the coil. Since the number of turns of the coil is fixed for each reducing agent injector, the electromagnetic force of the electromagnetic solenoid is determined by the current flowing into the electromagnetic solenoid.

The flowability of current in the electromagnetic solenoid varies with the electric resistance of the coil of the electromagnetic solenoid. As the electric resistance of the coil of the electromagnetic solenoid relatively increases, the current less easily flows. In this case, the current that flows when a predetermined voltage is applied to the electromagnetic solenoid for a given duration relatively decreases. Accordingly, moving the valve needle to a predetermined position takes relatively longer time, and holding the valve needle at the predetermined position needs current output signal with a relatively larger DUTY ratio.

Also, the mobility of the valve needle varies with the frictional force of a sliding part of the valve needle. With a relatively large frictional force of the sliding part of the valve needle, even when a specified electromagnetic force is generated by the electromagnetic solenoid, the valve needle starts to move later, moves more slowly and is held at a predetermined position later.

Also, the injection amount of a reducing agent to be injected from the reducing agent injector is determined by a valve opening duration of the reducing agent injector and a pressure of the reducing agent in the reducing agent injector. However, even when the reducing agent is injected at the same time under the same pressure, the amount of produced ammonia varies with the viscosity and concentration of the reducing agent.

In view of the above, with utmost effort, the present inventor noted that the electric resistance of the electromagnetic solenoid, the sliding friction of the valve needle or the viscosity and concentration of the aqueous solution of urea are a parameter or parameters that vary with temperature, and has found that the above-described problems can be solved by correcting control signal provided to a switching device based on the temperature in the reducing agent injector to achieve the present invention. Thus, it is an object of the present invention to provide a controller and control method of a reducing agent injector that can accurately feed required amount of ammonia to reduction catalyst.

Means for Solving the Problems

In order to solve the above-described problems, according to the present invention, a reducing agent injector controller for controlling a reducing agent injector that injects reducing agent into an exhaust gas passageway of an internal combustion engine by controlling ON/OFF of a switching device to control energization of an electromagnetic solenoid is provided, including: a target injection amount calculator for calculating a target injection amount of the reducing agent; a first current output signal calculator for calculating the duration of providing a first current output signal for generating a first current to be provided to the electromagnetic solenoid at the start of injection and calculating the DUTY ratio of the first current output signal; a second current output signal calculator for calculating the DUTY ratio representing the duration of providing a second current output signal for generating a second current to be provided after the first current is provided; a temperature calculator for estimating a given type of temperature within the reducing agent injector; and an output signal corrector for correcting at least one of the first current output signal and the second current output signal based on the given type of temperature estimated.

Furthermore, the reducing agent injector controller of the invention is preferably configured such that the temperature calculator estimates a temperature of the electromagnetic solenoid as the given type of temperature, and the output signal corrector corrects at least one of the DUTY ratio of the first current output signal and the DUTY ratio of the second current output signal based on the temperature of the electromagnetic solenoid.

Furthermore, the reducing agent injector controller of the invention is preferably configured such that the temperature calculator estimates a temperature of a sliding part of a valve needle of the reducing agent injector as the given type of temperature, and the output signal corrector corrects the duration of providing the second current output signal based on the temperature of the sliding part.

Furthermore, the reducing agent injector controller of the invention is preferably configured such that the temperature calculator estimates a temperature of the reducing agent as the given type of temperature, and the output signal corrector corrects the duration of providing the second current output signal based on the temperature of the reducing agent.

Furthermore, the reducing agent injector controller of the invention is preferably configured such that the switching device includes two switching devices provided on the upstream-side and the downstream-side from the electromagnetic solenoid, ON/OFF switching of one switching device of the two switching devices defining opening and closing timings of the reducing agent injector, ON/OFF switching of the other switching device controlling the DUTY of the first current output signal and the second current output signal, and the output signal corrector, based on the temperature of the reducing agent, corrects the ON duration of the one switching device and changes the closing timing of the reducing agent injector.

Furthermore, the reducing agent injector controller of the invention is preferably configured such that the temperature calculator estimates a tip temperature of the reducing agent injector as the given type of temperature, and the output signal corrector lengthens the opening duration of the reducing agent injector when the tip temperature exceeds a predetermined threshold.

Furthermore, the reducing agent injector controller of the invention is configured to provide a reducing agent injector control method for controlling a reducing agent injector that injects reducing agent into an exhaust gas passageway of an internal combustion engine by controlling ON/OFF of a switching device to control energization of an electromagnetic solenoid, including: estimating a given type of temperature within the reducing agent injector, and, based on the given type of temperature estimated, correcting at least one of a first current output signal for generating a first current to be provided to the electromagnetic solenoid at the start of injection and a second current output signal for generating a second current to be provided after the first current is provided.

Advantage of the Invention

According to the controller and control method of a reducing agent injector of the invention, at least one of the first current output signal and the second current output signal is corrected based on the given type of temperature estimated within the reducing agent injector, which reduces an error between the target injection amount and an actual injection amount due to variation in physical characteristics of the reducing agent injector, an error between the target injection amount and the actual injection amount due to variation in the properties and characteristics of the reducing agent, or an error in the amount of ammonia produced. Accordingly, just the right amount of ammonia as required is provided to a reduction catalyst, which prevents NOX and ammonia to be released into atmosphere.

Furthermore, in the reducing agent injector controller of the invention, the output signal corrector corrects at least one of the DUTY ratio of the first current output signal and the DUTY ratio of the second current output signal based on the temperature of the electromagnetic solenoid, which reduces variation in the current flowing into the electromagnetic solenoid due to fluctuation in the electric resistance of the electromagnetic solenoid. Accordingly, opening and closing of the reducing agent injector is accurately performed, and an excessive amount of the first and second currents flowing into the electromagnetic solenoid to increase power consumption is avoided.

Furthermore, in the reducing agent injector controller of the invention, the output signal corrector corrects the duration of providing the second current output signal based on the temperature of the sliding part of the valve needle, which changes the end timing of the period of opening the reducing agent injector to reduce variation in the injection amount due to fluctuation in the sliding friction of the valve needle and variation in the amount of produced ammonia. Accordingly, a required amount of ammonia is provided to the reduction catalyst.

Furthermore, in the reducing agent injector controller of the invention, the output signal corrector corrects the duration of providing the second current output signal based on the temperature of the reducing agent, which reduces variation in the injection amount due to the viscosity and concentration of the reducing agent and variation in the amount of produced ammonia. Accordingly, a required amount of ammonia is provided to the reduction catalyst.

Furthermore, in the reducing agent injector controller of the invention, the switching device includes two switching devices, and the output signal corrector corrects ON duration of one switching device defining opening and closing timings of the reducing agent injector, which adjusts the injection duration of the reducing agent to correct the injection amount of the reducing agent.

Furthermore, in the reducing agent injector controller of the invention, the output signal corrector lengthens the opening duration of the reducing agent injector when the tip temperature exceeds a predetermined threshold, which lengthens the injection duration of the reducing agent when thermal damage to the reducing agent injector may likely occur. Accordingly, cooling of the reducing agent injector is facilitated by heat transmission from the reducing agent injector to the reducing agent, which prevents thermal damage to the reducing agent injector.

BRIEF DESCRIPTION OF THE DRAWINGS

FIG. 6 A diagram showing variation in characteristics of the reducing agent injector and the reducing agent versus variation in temperatures.

DETAILED DESCRIPTION

A controller and control method of a reducing agent injector in accordance with an embodiment of the present invention are described in detail below. However, the embodiment is intended to show an aspect of the invention and is not intended to limit the invention, and various modifications may be implemented without departing from the scope of the invention. Through the drawings of the embodiments, like components are denoted by like numerals, and their descriptions are omitted as appropriate.

1. Exhaust Gas Purification Apparatus of Internal Combustion Engine

Figure 1:
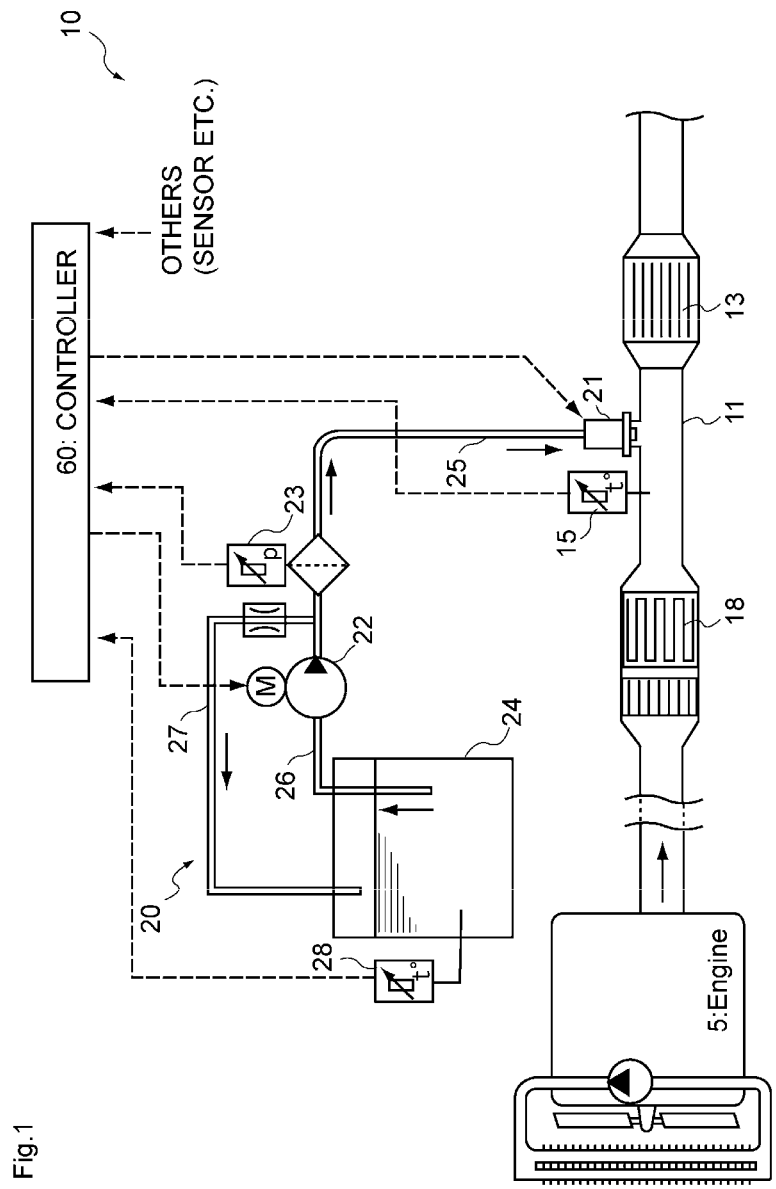
FIG. 1 A diagram showing a configuration example of an exhaust gas purification apparatus.

FIG. 1 is an overall view showing a configuration example of an exhaust gas purification apparatus 10. The exhaust gas purification apparatus 10 includes: a reduction catalyst 13 provided in an exhaust pipe 11 of an internal combustion engine 5; and a reducing agent feeder 20 for feeding reducing agent, by a reducing agent injector 21, into the exhaust pipe 11 on the upstream side from the reduction catalyst 13. Also, a temperature sensor 15 is provided in the exhaust pipe 11 on the upstream side from the reduction catalyst 13.

Also, the exhaust gas purification apparatus 10 includes a filter 18 for collecting exhaust particles in exhaust gas, in the exhaust pipe 11 on the upstream side from the location of the reducing agent injector 21. In the filter 18, at an appropriate timing when it seems that the amount of the exhaust particles deposited has exceeded a predetermined amount, forced regeneration is performed, i.e., the exhaust particles are forced to burn.

For the reduction catalyst 13, for example, a selective reduction catalyst is used that has a function to adsorb ammonia produced from the hydrolysis of a reducing agent, such as aqueous solution of urea, and can selectively reduce NOX contained in incoming exhaust gas. When NOX acts with ammonia in the reduction catalyst 13, NOX is decomposed into nitrogen, water, carbon dioxide and the like to be released into atmosphere.

The reducing agent feeder 20 includes the reducing agent injector 21, a storage tank 24 for storing reducing agent, a pump 22 for pumping reducing agent from the storage tank 24 toward the reducing agent injector 21 and a controller 60 for drive-controlling the reducing agent injector 21 and pump 22. The storage tank 24 is connected to the pump 22 by a first feeding path 26, and the pump 22 is connected to the reducing agent injector 21 by a second feeding path 25. A circulating path 27 is also provided between the reducing agent injector 21 and the storage tank 24. A reducing agent temperature sensor 28 is provided in the storage tank 24. On the second feeding path 25, a pressure sensor 23 for detecting feeding pressure towards the reducing agent injector 21.

For example, the pump 22 may be a motorized pump drive-controlled by the controller 60. In the exhaust gas purification apparatus 10 of the embodiment, the pump 22 is feedback-controlled so that the pressure detected by the pressure sensor 23 provided on the second feeding path 25 is maintained at a predetermined value.

In the embodiment, aqueous solution of urea is used as a reducing agent. The aqueous solution of urea has a concentration predetermined so that its target injection amount can be calculated depending on the amount of ammonia required for purifying NOX. For example, 32.5 wt % of aqueous solution of urea is used in consideration of reaction efficiency and freezing temperature.

The reducing agent injector 21 is an electromagnetic driven ON-OFF valve of which opening and closing are controlled by controlling energization of an electromagnetic solenoid. The reducing agent injector 21 is attached to the exhaust pipe 11 directly or with an inlet pipe in between. Reducing agent pumped by the pump 22 is fed to the reducing agent injector 21 with a predetermined pressure. With this, when the reducing agent injector 21 is opened by control signal provided by the controller 60, the reducing agent is injected into the exhaust pipe 11. One configuration example of the reducing agent injector 21 is described below.

2. Reducing Agent Injector

Figure 2:
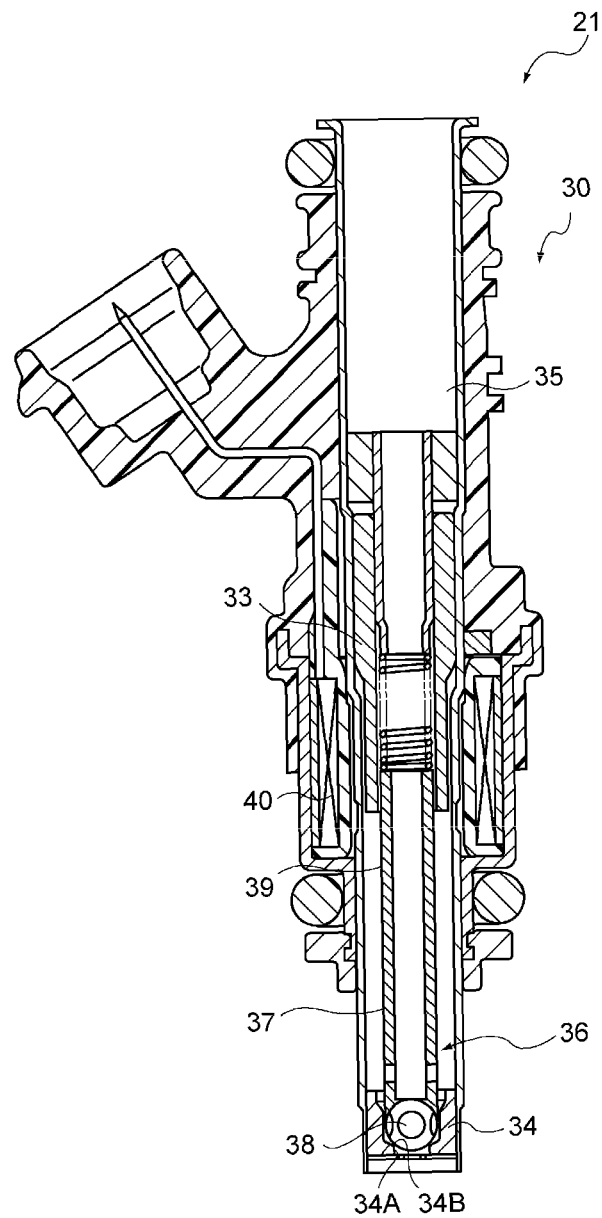
FIG. 2 A cross-sectional view showing a configuration example of a reducing agent injector.

FIG. 2 is a cross-sectional view showing a configuration of the reducing agent injector 21 used in the exhaust gas purification apparatus 10 of the embodiment. The reducing agent injector 21 includes, as main components: a cylindrical casing 30; a core sleeve 33 press-fitted into the casing 30; a valve needle 36 provided in the core sleeve 33; a valve body 34 provided at one end of the core sleeve 33; and an electromagnetic solenoid 40 placed between the casing 30 and the core sleeve 33.

The valve body 34 includes an injection hole 34A and a seating section 34B provided to surround the injection hole 34A. The valve needle 36 includes: a spherical valve member 38 that leaves and sits in the seating section 34B of the valve body 34; and an armature 37 fastened to the valve member 38. The armature 37 is slidably retained in the core sleeve 33. Furthermore, a spring 39 is provided compressed in the core sleeve 33, always biasing the valve needle 36 in the closing direction.

Insides of the casing 30 and core sleeve 33 are configured as a reducing agent passageway 35. The reducing agent passageway 35 has an inlet at the end (top end side) opposite the end at which the injection hole 34A is positioned, and extends in the axis direction from the inlet to the end (bottom end side) at which the injection hole 34A is positioned.

Furthermore, the casing 30 includes a connector through which current flows into the electromagnetic solenoid 40.

In the reducing agent injector 21 shown in FIG. 2, when the electromagnetic solenoid 40 is energized, the electromagnetic solenoid 40 attracts the armature 37 of the valve needle 36 by electromagnetic force, causing the valve needle 36 to slide in the core sleeve 33 toward the top end side and leave the seating section 34B. This causes the reducing agent to be injected into the exhaust pipe 11. The valve needle 36 having moved to the top end side is magnetically absorbed by the electromagnetic solenoid 40 and retained abutted against the core sleeve 33.

On the other hand, when energization of the electromagnetic solenoid 40 is stopped, the valve needle 36 moves toward the bottom end side by the bias from the spring 39 and the pressure from the reducing agent to sit in the seating section 34B. This causes the injection of the reducing agent to be stopped.

3. Controller (1) Overall Configuration

Figure 3:
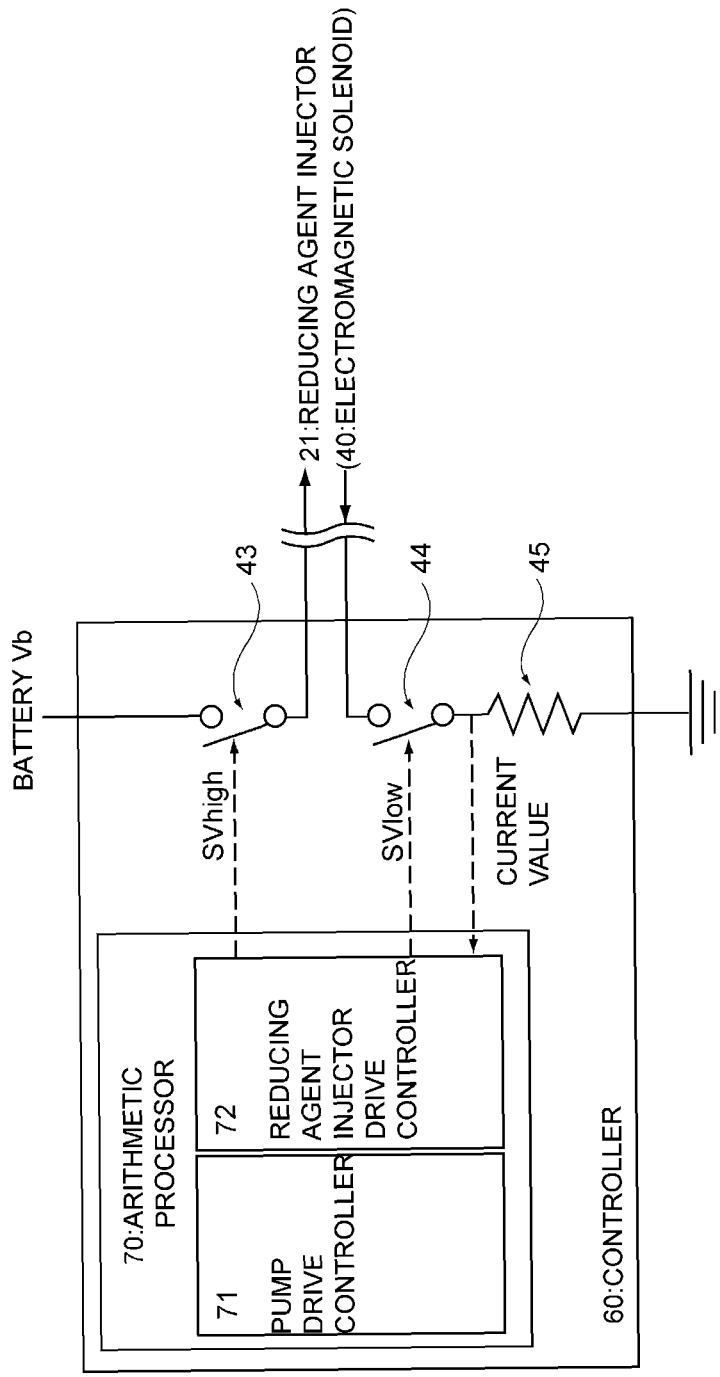
FIG. 3 A circuit diagram showing a reducing agent injector controller in accordance with an embodiment of the invention.

FIG. 3 is a circuit diagram showing a configuration example of the controller 60 of the embodiment. The controller 60 includes an upstream-side switching device 43, a downstream-side switching device 44, an arithmetic processor 70, a random access memory (RAM), not shown, for storing various information and the like.

The upstream-side switching device 43 and the downstream-side switching device 44 are provided in series. The upstream-side switching device 43 has one end electrically connected to a power supply voltage Vb and the other end electrically connected to one end of a coil of the electromagnetic solenoid 40. The downstream-side switching device 44 has one end electrically connected to the other end of the coil of the electromagnetic solenoid 40 and the other end grounded through a resistor 45.

ON/OFF of the upstream-side switching device 43 and downstream-side switching device 44 are PWM controlled by a upstream-side PWM signal SVhigh and a downstream-side PWM signal SVlow, respectively, provided from the arithmetic processor 70.

The downstream-side switching device 44 is typically PWM controlled so as to be set to ON-state in line with the period of injecting the reducing agent. In the embodiment, the reducing agent injector 21 is configured to start injection of the reducing agent with a constant period, and the injection duration is determined by the ON-OFF DUTY ratio of the downstream-side switching device 44. When the downstream-side switching device 44 is in OFF-state, the circuit is not closed whether the upstream-side switching device 43 is in ON- or OFF-state, so energization of the electromagnetic solenoid 40 is stopped.

On the other hand, the upstream-side switching device 43 is typically used to control the current flowing into the electromagnetic solenoid 40. Specifically, in the embodiment, during the period of injecting the reducing agent and with the downstream-side switching device 44 set to ON-state, the current flowing into the electromagnetic solenoid 40 is controlled by controlling ON/OFF of the upstream-side switching device 43. The ON/OFF DUTY ratio of the upstream-side switching device 43 is controlled such that a first current or a second current having a different magnitude flows into the electromagnetic solenoid 40.

Figure 4:
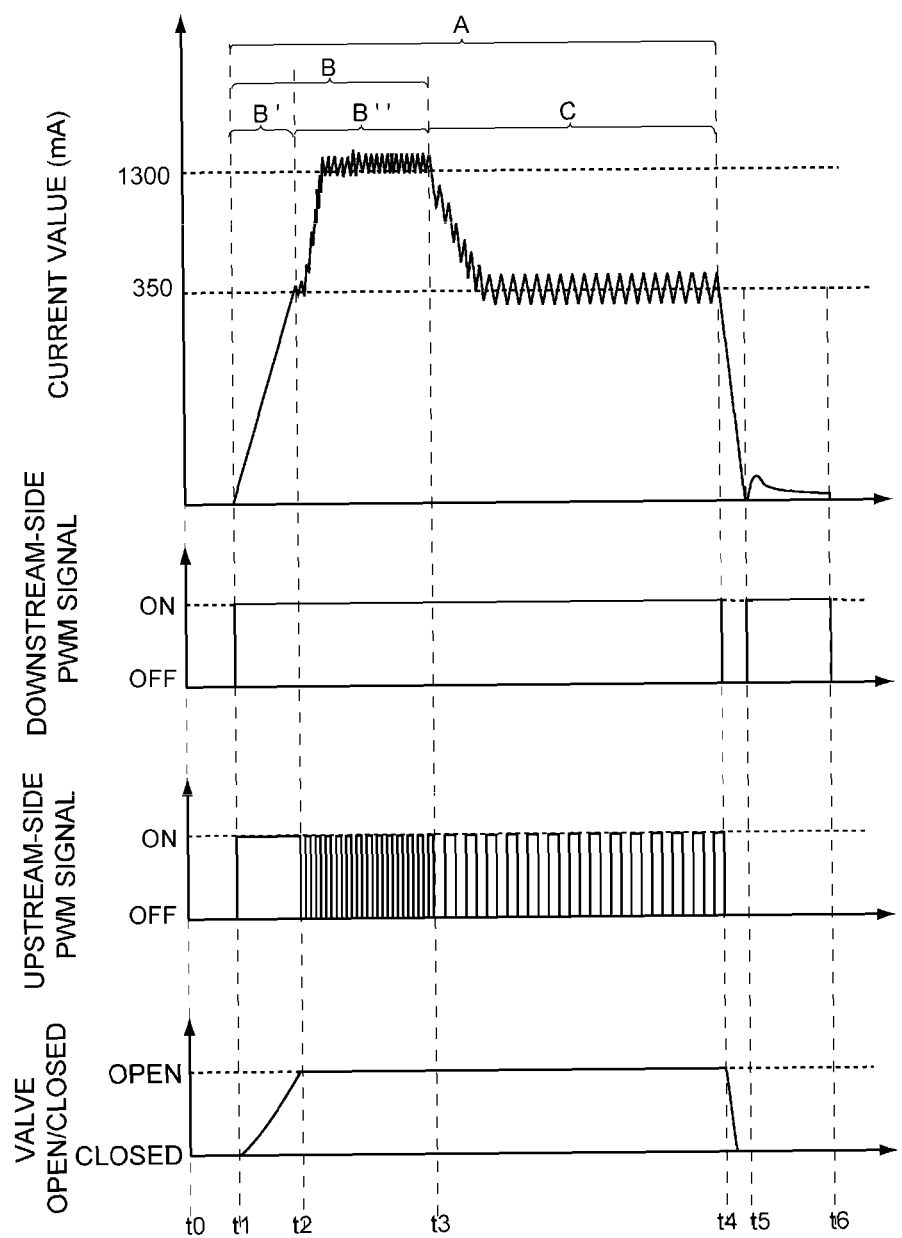
FIG. 4 A timing chart showing a control method of a reducing agent injector in accordance with an embodiment of the invention.

FIG. 4 is a timing chart showing the operating state of the reducing agent injector controlled by the controller 60 of the embodiment. FIG. 4 shows, from the top in this order, the current flowing into the electromagnetic solenoid 40, the ON/OFF state of the downstream-side switching device 44, the ON/OFF state of the upstream-side switching device 43 and the opening/closing state of the reducing agent injector 21, over time.

During the period from t0 to t1, the upstream-side PWM signal SVhigh and the downstream-side PWM signal SVlow are not provided to the upstream-side switching device 43 and the downstream-side switching device 44, so both the upstream-side switching device 43 and the downstream-side switching device 44 are in OFF-state. During this period, the electromagnetic solenoid 40 is not energized, and the injection hole 34A is closed by the valve needle 36.

Next, at the time of t1, both the upstream-side switching device 43 and the downstream-side switching device 44 are caused to be in ON-state, which starts energization of the electromagnetic solenoid 40. In the successive period from t1 to t2 (a first period B' in FIG. 4), both the upstream-side switching device 43 and the downstream-side switching device 44 are kept in ON-state, which maintains energization of the electromagnetic solenoid 40. As a result, the valve needle 36 starts to move against the bias from the spring 39 and the pressure of the reducing agent in the reducing agent injector 21 to open the injection hole 34A.

Next, at the time of t2, the current flowing into the electromagnetic solenoid 40 reaches a set value of the second current, and in the successive period from t2 to t3 (a second period B" in FIG. 4), the downstream-side switching device 44 is kept in ON-state, whereas the upstream-side PWM signal SVhigh with a controlled DUTY ratio is provided to the upstream-side switching device 43 with a relatively high frequency. As a result, ON/OFF switching of the upstream-side switching device 43 is repeated, and then, the current flowing into the electromagnetic solenoid 40 reaches a set value of the first current and, from this point forward, is kept to the value of the first current.

During this period from t1 to t3 (the period B of providing the first current in FIG. 4), the first current flows into the electromagnetic solenoid 40, which allows the valve needle 36 to quickly start to move, improving the responsiveness in opening the valve. As a result, error in the amount of the reducing agent injected during the injection period may be reduced.

Next, at the time of t3, the DUTY ratio and frequency of the upstream-side PWM signal SVhigh provided to the upstream-side switching device 43 is changed, and in the successive period from t3 to t4 (the period C of providing the second current in FIG. 4), the downstream-side switching device 44 is kept in ON-state, whereas the upstream-side PWM signal SVhigh is provided to the upstream-side switching device 43 with a frequency lower than that in the second period B" of the period B of providing the first current. As a result, ON/OFF switching of the upstream-side switching device 43 is repeated, and then, the current flowing into the electromagnetic solenoid 40 decreases to the set value of the second current and, from this point forward, is kept to the value of the second current.

Next, at the time of t4, both the upstream-side switching device 43 and the downstream-side switching device 44 are caused to be in OFF-state, which stops energization of the electromagnetic solenoid 40. From this point forward, the current flowing into the electromagnetic solenoid 40 decreases sharply and the reducing agent injector 21 is quickly closed.

It should be noted that, in FIG. 4, in the period from t5 to t6 after the reducing agent injector 21 is closed, with the upstream-side switching device 43 set to OFF-state, the downstream-side switching device 44 is set to ON-state. As a result, no current remains in the electromagnetic solenoid 40, eliminating an error in the operation of the reducing agent injector 21.

In the embodiment, the set value of the first current is set to, for example, 1300 mA and the set value of the second current is set to, for example, 350 mA. The first current larger than the second current configured to flow into the electromagnetic solenoid 40 at the start of injection shortens the time from when the first current flows into the electromagnetic solenoid 40 until when the valve needle 36 moves to be abutted against the core sleeve 33, improving the responsiveness in opening the reducing agent injector 21.

It should be noted that, the controller 60 of the embodiment is configured to control ON/OFF of the upstream-side switching device 43 with the downstream-side switching device 44 set to ON-state, but may be configured to control ON/OFF of the downstream-side switching device 44 with the upstream-side switching device 43 set to ON-state. Also, only one switching device may be used or three or more switching devices may be used. As with the controller 60 of the embodiment, a configuration in which energization of the electromagnetic solenoid 40 is controlled by controlling ON/OFF of two switching devices allows accurate control of opening or closing timing of the reducing agent injector 21. Furthermore, with this configuration, even when one switching device stops working due to a failure, left in ON-state, the other switching device can be set to OFF-state to stop energization of the electromagnetic solenoid 40.

(2) Arithmetic Processor

A known microcomputer is used for the arithmetic processor 70 of the controller 60. The arithmetic processor 70 of the controller 60 shown in FIG. 3 includes a pump drive controller 71 and a reducing agent injector drive controller 72. The arithmetic processor 70 can read information relating to the operating state of the internal combustion engine 5 and information such as an exhaust gas flow rate Vgas, a vehicle speed Sp and an outside air temperature Tair. The pump drive controller 71 of the arithmetic processor 70 continuously reads a pressure value detected by the pressure sensor 23 provided on the second feeding path 25, and feedback-controls the pump 22 so that the pressure value is maintained at a predetermined value.

Figure 5:
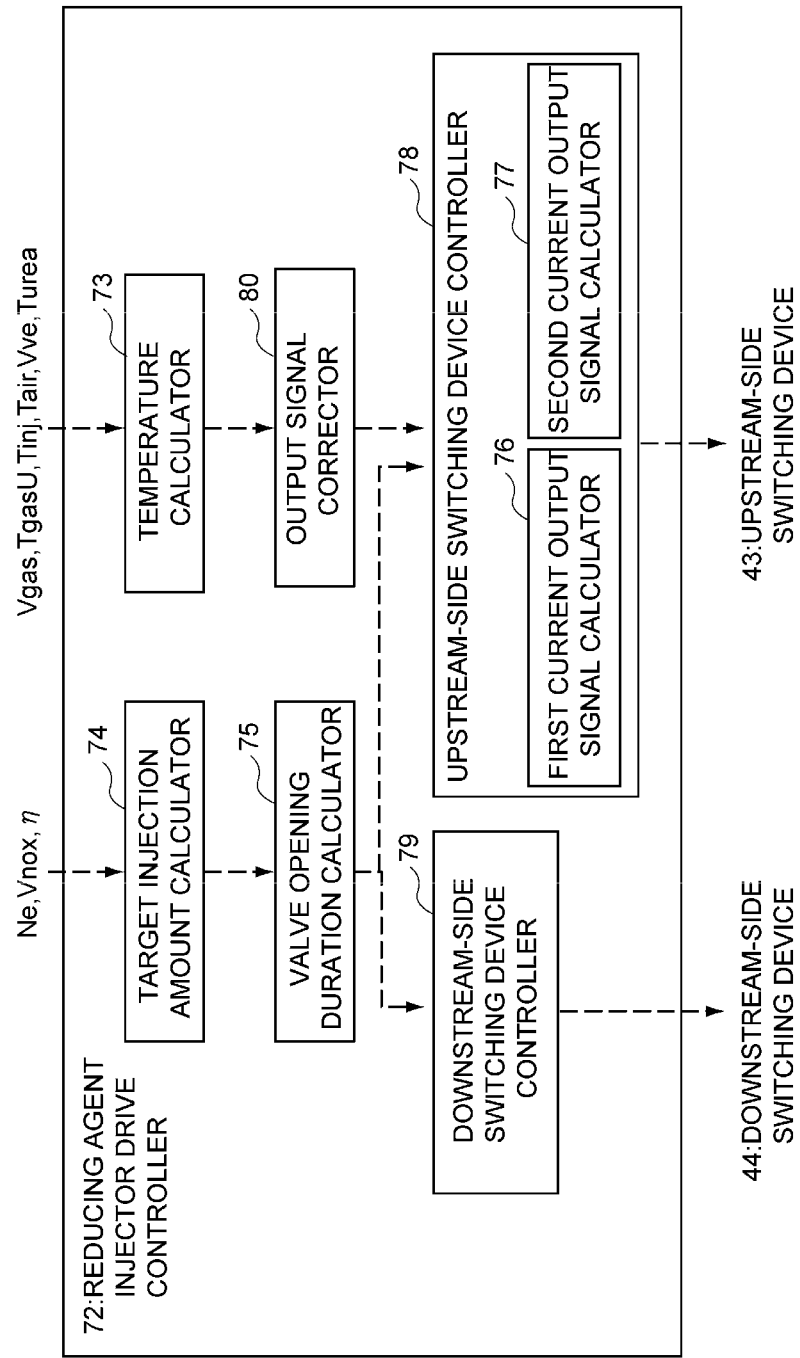
FIG. 5 A block diagram showing a configuration example of an arithmetic processor of the reducing agent injector controller.

FIG. 5 is a functional block diagram showing a configuration example of the reducing agent injector drive controller 72 of the arithmetic processor 70. The reducing agent injector drive controller 72 includes a temperature calculator 73, a target injection amount calculator 74, a valve opening duration calculator 75, an upstream-side switching device controller 78, a downstream-side switching device controller 79 and a output signal corrector 80. The upstream-side switching device controller 78 includes a first current output signal calculator 76 and a second current output signal calculator 77. These components are implemented by a program executed by a microcomputer.

(2)-1 Temperature Calculator

The temperature calculator 73 estimates various temperatures within the reducing agent injector 21 by calculation. In the controller 60 of the embodiment, the temperature calculator 73 estimates a tip temperature Tinj of the reducing agent injector 21, a temperature Tvlv of a sliding part of the valve needle 36, a temperature Tsr of the electromagnetic solenoid 40 and a temperature Turea of the reducing agent.

The tip temperature Tinj of the reducing agent injector 21 is calculated, for example, by reading the flow rate Vgas of exhaust gas and a temperature TgasU of exhaust gas on the upstream side from the reduction catalyst 13 detected by the temperature sensor 15 and considering heat transmission efficiency from the exhaust pipe 11 to the reducing agent injector 21 and the like.

The temperature Tvlv of the sliding part of the valve needle 36 is calculated, for example, by considering cooling efficiency due to the heat transmission efficiency within the reducing agent injector 21, the outside air temperature Tair, the vehicle speed Vve and the like based on the calculated tip temperature Tinj of the reducing agent injector 21.

The temperature Tsr of the electromagnetic solenoid 40 is calculated, for example, by considering cooling efficiency due to the heat transmission efficiency within the reducing agent injector 21, the outside air temperature Tair, the vehicle speed Vve and the like based on the calculated tip temperature Tinj of the reducing agent injector 21 and also considering the current flowing into the electromagnetic solenoid 40. The relation between the current flowing into the electromagnetic solenoid 40 and the amount of heat generation due to the current may be previously stored.

The temperature Turea of the reducing agent is calculated, for example, based on a temperature Turea' of the reducing agent in the storage tank 24 detected by the reducing agent temperature sensor 28 and the calculated temperature Tvlv of the sliding part of the valve needle 36. However, the temperature Turea of the reducing agent may be estimated in any other way as appropriate.

The temperature information calculated as above is used to correct output signals provided from the upstream-side switching device controller 78 and the downstream-side switching device controller 79 to the switching devices.

It should be noted that a method for calculating the above-described temperatures is not limited to the above examples.

(2)-2 Target Injection Amount Calculator

Based on: an NOX flow rate Vnox estimated by the number of revolution Ne of the internal combustion engine 5, the exhaust gas flow rate Vgas and the like; a catalyst efficiency estimated in connection with a reduction catalyst temperature Tcat; and the like, the target injection amount calculator 74 calculates an ammonia amount Da required to reduce NOX contained in exhaust gas and calculates a target injection amount Qutgt of the reducing agent capable of producing ammonia of the amount Da.

(2)-3 Valve Opening Duration Calculator

The valve opening duration calculator 75 calculates a valve opening duration Tiopn of the reducing agent injector 21 based on the target injection amount Qutgt calculated by the target injection amount calculator 74. In the embodiment, since the reducing agent fed to the reducing agent injector 21 is maintained at a constant pressure by feedback control of the pump 22, the valve opening duration Tiopn of the reducing agent injector 21 is determined basically based on the target injection amount Qutgt.

(2)-4 Downstream-Side Switching Device Controller

The downstream-side switching device controller 79 controls ON/OFF of the downstream-side switching device 44 by providing the downstream-side PWM signal SVlow to the downstream-side switching device 44. Specifically, the downstream-side switching device controller 79 causes the downstream-side switching device 44 to repeat ON/OFF switching at a constant frequency while changing the ON/OFF DUTY ratio of the downstream-side switching device 44.

As described above, in the embodiment, injection of the reducing agent is configured to be started at a constant frequency, and the downstream-side switching device 44 is set to ON-state for a duration that is set to be equal to the valve opening duration Tiopn calculated by the valve opening duration calculator 75.

(2)-5 Upstream-Side Switching Device Controller

The upstream-side switching device controller 78 controls ON/OFF of the upstream-side switching device 43 by providing the upstream-side PWM signal SVhigh to the upstream-side switching device 43. Specifically, during the period of injecting the reducing agent, i.e., the period during which the downstream-side switching device 44 is set to ON-state, the upstream-side switching device controller 78 controls current flowing into the electromagnetic solenoid 40 by controlling ON/OFF of the upstream-side switching device 43.

In the embodiment, during the period of injecting the reducing agent, the first current and the second current are sequentially provided to the electromagnetic solenoid 40. The first current is a current to be provided in the beginning of injection start in order to quickly move the valve needle 36 of the reducing agent injector 21 to be abutted against the core sleeve 33, causing the injection hole to open early, and is set to a relatively large value. On the other hand, the second current is a current to be provided after the first current is provided in order to retain the valve needle 36 abutted against the core sleeve 33, after moved to the position, with a low power, and is set to a relatively smaller value than the first current.

The upstream-side switching device controller 78 includes the first current output signal calculator 76 and the second current output signal calculator 77 and provides a control signal to the upstream-side switching device 43 based on the calculation result by the calculators 76 and 77.

The first current output signal calculator 76 calculates a first time Ti1 taken from when energization of the electromagnetic solenoid 40 starts until when the current reaches a set value of the second current, based on a present value of the power supply voltage Vb for driving the reducing agent injector 21, and calculates the ON/OFF DUTY ratio of the upstream-side switching device 43 such that the current flowing into the electromagnetic solenoid 40 is set to the first current after the time Ti1 elapses.

During the first time Ti1 from when energization of the electromagnetic solenoid 40 starts until when the current reaches the set value of the second current, the upstream-side switching device 43 is kept in ON-state. Since the set value of the second current is predefined, the duration of the first time Ti1 can be calculated based on the present power supply voltage Vb detected.

On the other hand, during a second time Ti2 during which the first current is being provided, ON/OFF of the upstream-side switching device 43 is DUTY-controlled so that the value of the current oscillates centering around the set value of the first current. The end of the period during which the first current is being provided is previously set to when a predetermined time elapses from the start of energization of the electromagnetic solenoid 40.

The second current output signal calculator 77 reads the present power supply voltage Vb detected to calculate the ON/OFF DUTY ratio of the upstream-side switching device 43 required to continue providing the second current and the end timing of a time Ti3 during which the second current is being provided. The second current is started to flow after the first current flows, and is stopped to flow when the valve opening duration Tiopn ends, i.e., the period during which the downstream-side switching device 44 is kept in ON-state ends.

Also, the second current output signal calculator 77 of the embodiment can correct the DUTY ratio based on the difference between the value of the second current having been provided to the electromagnetic solenoid 40 during the immediately preceding injection period and the set value of the second current previously set. Specifically, the second current output signal calculator 77 calculates the ratio of the value of the previous second current and the set value of the second current, and multiplies the calculated ON/OFF DUTY ratio by a correction coefficient depending on this ratio.

(2)-6 Output Signal Corrector

The output signal corrector 80 corrects at least one of the first current output signal and the second current output signal based on temperature information estimated by the temperature calculator 73. The output signal corrector 80 of the embodiment corrects the length of the first time Ti1 of the first current output signal based on the temperature Tvlv of the sliding part of the valve needle 36, corrects at least one of the DUTY ratio of the first current output signal and the DUTY ratio of the second current output signal based on the temperature Tsr of the electromagnetic solenoid 40, and corrects the end of the period during which the second current output signal is being provided based on the temperature Turea of the reducing agent.

The correction of the first current output signal and the second current output signal performed by the output signal corrector 80 is described in detail below with reference to FIG. 6. FIG. 6 shows the various temperatures within the reducing agent injector 21 when the temperatures vary versus the physical characteristics of the reducing agent injector 21 and the properties and characteristics of the reducing agent.

(i) Correction Based on Temperature of the Reducing Agent

Figure 7:
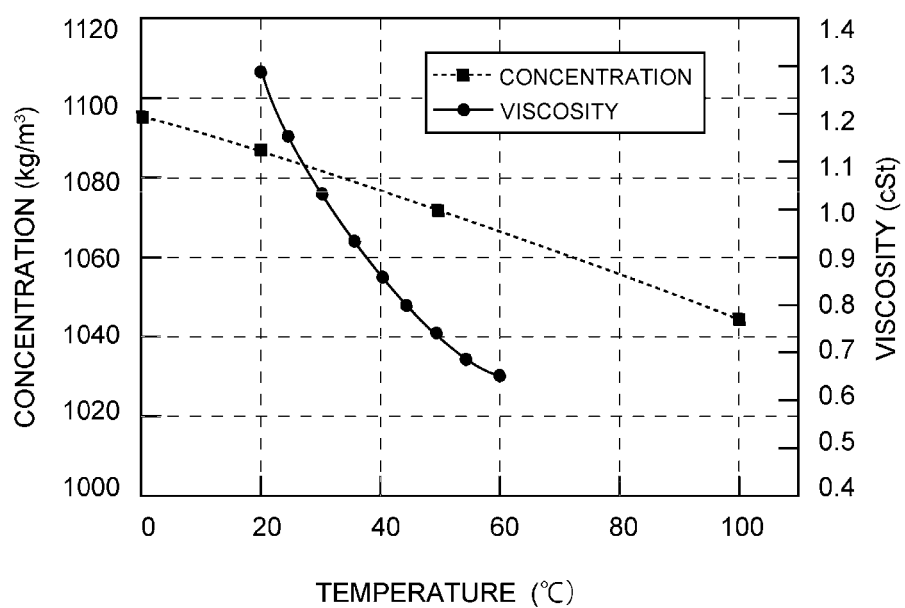
FIG. 7 A diagram showing the relation between the temperature of the reducing agent and the properties and characteristics of the reducing agent.

The temperature Turea of the reducing agent has an effect on the viscosity and concentration of the reducing agent. Specifically, as shown in FIG. 7, as the temperature Turea increases, the viscosity of the reducing agent sharply decreases, whereas the concentration of the reducing agent slightly decreases. Due to this, from the viewpoint of the amount of ammonia reaching the reduction catalyst, increase in the temperature Turea of the reducing agent may likely lead to an excessive injection amount of the reducing agent. Conversely, as the temperature Turea decreases, the viscosity of the reducing agent sharply increases, whereas the concentration of the reducing agent slightly increases. Due to this, from the viewpoint of the amount of ammonia reaching the reduction catalyst, decrease in the temperature Turea of the reducing agent may likely lead to an insufficient injection amount of the reducing agent.

The output signal corrector 80 compares the temperature Turea of the reducing agent with a reference temperature Turea0 of the reducing agent used in setting a calculating formula of the target injection amount, and, based on the difference, corrects the duration of injecting the reducing agent, i.e., the duration of providing the second current output signal and the DUTY of the downstream-side PWM signal SVlow. When the temperature Turea of the reducing agent is higher than the reference temperature Turea0, correction is made to shorten the duration of providing the second current output signal and to reduce the DUTY of the downstream-side PWM signal SVlow. On the other hand, when the temperature Turea of the reducing agent is lower than the reference temperature Turea0, correction is made to lengthen the duration of providing the second current output signal and to increase the DUTY of the downstream-side PWM signal SVlow. As a result, an appropriate injection amount of the reducing agent is injected so that a required amount of ammonia for reducing NOX is provided to the reduction catalyst 13 independent of the temperature Turea of the reducing agent.

(ii) Correction Based on Temperature of the Sliding Part of the Valve Needle

The temperature Tvlv of the sliding part of the valve needle 36 has an effect on the slidability of the valve needle 36. Specifically, the reducing agent injector 21 has a physical characteristic in which, when the temperature Tvlv of the sliding part of the valve needle 36 increases, the sliding resistance of the valve needle 36 decreases. Due to this, when the temperature Tvlv of the sliding part of the valve needle 36 increases, the time to opening of the valve by the valve needle 36 is shortened, which may likely lead to an excessive current provided in the beginning of opening of the valve and an excessive injection amount of the reducing agent. Conversely, the reducing agent injector 21 has a physical characteristic in which, when the temperature Tvlv of the sliding part of the valve needle 36 decreases, the sliding resistance of the valve needle 36 increases. Due to this, when the temperature Tvlv of the sliding part of the valve needle 36 decreases, the time to opening of the valve by the valve needle 36 is lengthened, which may likely lead to an insufficient current provided in the beginning of opening of the valve and an insufficient injection amount of the reducing agent.

The output signal corrector 80 compares the temperature Tvlv of the sliding part of the valve needle 36 with a reference temperature Tvlv0 used in setting the calculating formula of the target injection amount, and, based on the difference, corrects the duration of injecting the reducing agent, i.e., the duration of providing the second current output signal and the DUTY of the downstream-side PWM signal SVlow. When the temperature Tvlv of the sliding part of the valve needle 36 is higher than the reference temperature Tvlv0, correction is made to shorten the duration of providing the second current output signal and to reduce the DUTY of the downstream-side PWM signal SVlow. On the other hand, when the temperature Tvlv of the sliding part of the valve needle 36 is lower than the reference temperature Tvlv0, correction is made to lengthen the duration of providing the second current output signal and to increase the DUTY of the downstream-side PWM signal SVlow. As a result, an appropriate injection amount of the reducing agent is injected so that a required amount of ammonia for reducing NOX is provided to the reduction catalyst 13 independent of the temperature Tvlv of the sliding part of the valve needle 36.

In order to eliminate variation in the injection amount due to the temperature Tvlv of the sliding part of the valve needle 36, the length of the first time Ti1 of the first current output signal may be corrected in addition to correcting the duration of injecting the reducing agent. Specifically, adjusting a rising time until when the current flowing into the reducing agent injector 21 reaches the set value of the first current so that the valve needle 36 reaches a predetermined position in a constant amount of time enables an appropriate injection amount of the reducing agent to be injected independent of the temperature Tvlv of the sliding part of the valve needle 36.

(iii) Correction Based on Temperature of the Electromagnetic Solenoid

The temperature Tsr of the electromagnetic solenoid 40 has an effect on the electric resistance of the coil of the electromagnetic solenoid 40. Specifically, the reducing agent injector 21 has a characteristic in which, when the temperature Tsr of the electromagnetic solenoid 40 increases, the electric resistance of the coil increases. Due to this, when the temperature Tsr of the electromagnetic solenoid 40 increases, the current flowing for the same duration decreases, resulting in a smaller amount of movement of the valve needle 36, which may likely lead to insufficiency of the injection amount of the reducing agent. Conversely, the reducing agent injector 21 has a characteristic in which, when the temperature Tsr of the electromagnetic solenoid 40 decreases, the electric resistance of the coil decreases. Due to this, when the temperature Tsr of the electromagnetic solenoid 40 decreases, the current flowing for the same duration increases, resulting in a larger amount of movement of the valve needle 36, which may likely lead to excess of the injection amount of the reducing agent.

The output signal corrector 80 compares the temperature Tsr of the electromagnetic solenoid 40 with a reference temperature Tsr0 used in setting the calculating formula of the target injection amount, and, based on the difference, corrects at least one of the DUTY ratio of the first current output signal and the DUTY ratio of the second current output signal. When the temperature Tsr of the electromagnetic solenoid 40 is higher than the reference temperature Tsr0, the DUTY ratio of the first current output signal or the DUTY ratio of the second current output signal is corrected to increase the DUTY ratio. When the temperature Tsr of the electromagnetic solenoid is lower than the reference temperature Tsr0, the DUTY ratio of the first current output signal or the DUTY ratio of the second current output signal is corrected to decrease the DUTY ratio. As a result, an appropriate injection amount of the reducing agent is injected so that a required amount of ammonia for reducing NOX is provided to the reduction catalyst 13 independent of the temperature of the electromagnetic solenoid 40.

It should be noted that the value of the current flowing into the electromagnetic solenoid 40 depends on the ON/OFF DUTY ratio of an energization signal and the frequency of ON/OFF switching. In the corrections (i) to (iii) described above, the correction of the DUTY ratio of the first current output signal or the second current output signal may also be replaced by the correction of the frequency of these output signals.

Furthermore, in the correction of the first current output signal or the second current output signal, the correction by decreasing the DUTY ratio or decreasing the duration of providing the signal allows a proper injection amount of the reducing agent and also avoids providing excessive current and waste of battery energy.

(iv) Correction Based on Tip Temperature

It is known that the electromagnetic solenoid 40 of the reducing agent injector 21 is relatively weak against heat, and insulative resin covering the electromagnetic solenoid 40 is also relatively weak against heat. The reducing agent injector 21 is attached to the exhaust pipe 11 directly or with an inlet pipe in between, and thus is easily influenced by exhaust heat. Particularly, the exhaust gas purification apparatus 10 according to the embodiment is configured to appropriately perform forced regeneration of the filter 18, which often exposes the reducing agent injector 21 to high temperature of exhaust heat.

Thus, in the embodiment, the tip temperature Tinj of the reducing agent injector 21 that is easily influenced by exhaust heat is detected, and correction is made such that, when the tip temperature Tinj becomes equal to or higher than a heat resistance threshold Tinj0, the injection duration of the reducing agent injector 21 is lengthened. Specifically, the DUTY ratio of the downstream-side PWM signal SVlow provided to the downstream-side switching device 44 is increased, and the period Ti3 of providing the second current output signal of the upstream-side PWM signal SVhigh provided to the upstream-side switching device 43 is lengthened. As a result, the flow rate of the reducing agent passing through the reducing agent injector 21 increases, then cooling of the reducing agent injector 21 is facilitated by heat transmission from the reducing agent injector 21 to the reducing agent, which prevents thermal damage to the reducing agent injector 21. For example, the heat resistance threshold Tinj0 is set to a value at which the temperatures of the electromagnetic solenoid 40 and a resin portion are maintained lower than the heat-resistant temperature, considering the heat transmission efficiency within the reducing agent injector 21.

The reduction catalyst 13 is a catalyst capable of absorbing ammonia. The target injection amount is typically set such that an actual adsorption amount does not reach the saturated adsorption amount of ammonia of the reduction catalyst, which prevents ammonia from flowing into the downstream-side of the reduction catalyst 13 even when the injection amount of the reducing agent temporarily increases. Also, once the injection amount of the reducing agent is increased, the injection amount of the reducing agent is adjusted so that the amount of ammonia absorbed to the reduction catalyst 13 returns to an adequate amount.

According to the controller 60 and control method of the reducing agent injector 21 in accordance with the embodiment described above, the first and second current output signals of the upstream-side PWM signal SVhigh and the downstream-side PWM signal SVlow are corrected based on the temperatures within the reducing agent injector 21. Due to this, the amounts of the first and second currents flowing into the electromagnetic solenoid 40 and the duration of providing these currents are adjusted according to the physical characteristics of the reducing agent injector 21 depending on the temperatures within the reducing agent injector 21 and according to the properties and characteristics of the reducing agent. Accordingly, an appropriate injection amount of the reducing agent is injected into the exhaust pipe 11 so that a required amount of ammonia for reducing NOX contained in exhaust gas is provided to the reduction catalyst 13 independent of the temperatures within the reducing agent injector 21.

Description of Reference Numerals and Signs

5: internal combustion engine, 10: exhaust gas purification apparatus, 11: exhaust pipe, 13: reduction catalyst, 15: temperature sensor, 18: filter, 20: reducing agent feeder, 21: reducing agent injector, 22: pump, 23: pressure sensor, 24: storage tank, 25: second feeding path, 26: first feeding path, 27: circulating path, 28: reducing agent temperature sensor, 30: casing, 33: core sleeve, 34: valve body, 34A: injection hole, 34B: seating section, 35: reducing agent passageway, 36: valve needle, 37: armature 38: valve member, 39: spring, 40: electromagnetic solenoid, 43: upstream-side switching device, 44: downstream-side switching device, 45: resistor, 60: controller (controller for reducing agent injector), 70: arithmetic processor, 71: pump drive controller, 72: reducing agent injector drive controller, 73: temperature calculator, 74: target injection amount calculator, 75: valve opening duration calculator, 76: first current output signal calculator, 77: second current output signal calculator, 78: upstream-side switching device controller, 79: downstream-side switching device controller, 80: output signal corrector

The invention claimed is:

1. A reducing agent injector controller for controlling a reducing agent injector that injects reducing agent into an exhaust gas passageway of an internal combustion engine by controlling ON/OFF of a switching device to control energization of an electromagnetic solenoid, the controller comprising:
a target injection amount calculator for calculating a target injection amount of the reducing agent;
a first current output signal calculator for calculating the duration of providing a first current output signal for generating a first current to be provided to the electromagnetic solenoid at the start of injection and calculating the DUTY ratio of the first current output signal;
a second current output signal calculator for calculating the DUTY ratio representing the duration of providing a second current output signal for generating a second current to be provided after the first current is provided;
a temperature calculator for estimating a given type of temperature within the reducing agent injector, the estimated given type of temperature being a temperature of a sliding part of a valve needle of the reducing agent injector; and
an output signal corrector for correcting at least one of the first current output signal and the second current output signal based on the given type of temperature estimated;
wherein when the output signal corrector corrects the second current output signal, the output signal corrector corrects the duration of providing the second current output signal based on the temperature of the sliding part;
wherein one of the first current output signal and the corrected first current output signal is provided to the electromagnetic solenoid, and one of the second current output signal and the corrected second current output signal is provided to the to the electromagnetic solenoid.

2. The reducing agent injector controller according to claim 1, wherein the temperature calculator estimates a temperature of the electromagnetic solenoid as the given type of temperature, and the output signal corrector corrects at least one of the DUTY ratio of the first current output signal and the DUTY ratio of the second current output signal based on the temperature of the electromagnetic solenoid.

3. The reducing agent injector controller according to claim 1, wherein the temperature calculator estimates a temperature of the reducing agent as the given type of temperature, and the output signal corrector corrects the duration of providing the second current output signal based on the temperature of the reducing agent.

4. The reducing agent injector controller according to claim 1,
wherein the switching device comprises two switching devices provided on an upstream-side and a downstream-side from the electromagnetic solenoid, ON/OFF switching of one switching device of the two switching devices defining opening and closing timings of the reducing agent injector, ON/OFF switching of the other switching device controlling the DUTY of the first current output signal and the second current output signal, and
wherein the output signal corrector, based on the temperature of the reducing agent, corrects the ON duration of the one switching device and changes the closing timing of the reducing agent injector.

5. The reducing agent injector controller according to claim 1,
wherein the temperature calculator estimates a tip temperature of the reducing agent injector as the given type of temperature, and
wherein the output signal corrector lengthens the opening duration of the reducing agent injector when the tip temperature exceeds a predetermined threshold.

6. A reducing agent injector control method for controlling a reducing agent injector that injects reducing agent into an exhaust gas passageway of an internal combustion engine by controlling ON/OFF of a switching device to control energization of an electromagnetic solenoid, the method comprising:
estimating a given type of temperature within the reducing agent injector, the estimated given type of temperature being a temperature of a sliding part of a valve needle of the reducing agent injector, and, based on the given type of temperature estimated, correcting at least one of a first current output signal for generating a first current to be provided to the electromagnetic solenoid at the start of injection and a second current output signal for generating a second current to be provided after the first current is provided;

wherein when the second current output signal is corrected, the duration of providing the second current output signal is corrected based on the temperature of the sliding part;

wherein one of the first current output signal and the corrected first current output signal is provided to the electromagnetic solenoid, and one of the second current output signal and the corrected second current output signal is provided to the to the electromagnetic solenoid.

* * * * *